United States Patent [19]

Uhrig et al.

[11] Patent Number: 4,939,238
[45] Date of Patent: Jul. 3, 1990

[54] NITROGEN-CONTAINING CONDENSATION PRODUCTS BASED ON UNMODIFIED OR MODIFIED NATURAL RESINS, PROCESS FOR THE PREPARATION THEREOF AND THE USE THEREOF

[75] Inventors: Heinz Uhrig, Steinbach/Taunus; Siegfried Schwerin, Hofheim am Taunus; Reinhold Deubel, Bad Soden am Taunus, all of Fed. Rep. of Germany

[73] Assignee: Hoechst Aktiengesellschaft, Frankfurt am Main, Fed. Rep. of Germany

[21] Appl. No.: 211,214

[22] Filed: Jun. 22, 1988

[30] Foreign Application Priority Data

Jun. 25, 1987 [DE] Fed. Rep. of Germany ....... 3720982

[51] Int. Cl.$^5$ .......................... C08H 3/05; C08L 93/04
[52] U.S. Cl. ..................... 530/212; 530/211; 524/801
[58] Field of Search ................................. 530/211, 212

[56] References Cited

U.S. PATENT DOCUMENTS

| | | | |
|---|---|---|---|
| 2,346,920 | 4/1944 | Humphrey | 530/212 |
| 2,346,921 | 4/1944 | Humphrey | 530/212 |
| 2,369,109 | 2/1945 | Rummelsburg | 530/212 |
| 2,864,810 | 12/1958 | Batdorf | 530/212 |
| 4,333,732 | 6/1982 | Denbel et al. | 530/212 |
| 4,693,846 | 9/1987 | Piccirilli et al. | 530/212 |

*Primary Examiner*—John Kight, III
*Assistant Examiner*—Dennis R. Daley

[57] ABSTRACT

Nitrogen-containing condensation products based on unmodified or modified natural resins, process for the preparation thereof and the use thereof.

The invention relates to surface-active agents of the general formula $$A-[(X-O)_n-Y-Z]_m$$

in which A is a radical of an unmodified or modified natural resin or esterification product thereof with a polyhydric alcohol, X is 1,2-ethylene or -propylene, Y is as defined for X or is $-CH_2CHOHCH_2-$, Z is OH or (Ia)

$$(-NH-Q)_a-NR-(Q-NH-)_bH \qquad \text{(Ia)}$$

in which R is H or $C_1$-$C_{24}$—alkyl or $(-CH_2CH_2O)_p-H$, with p being 1 to 100, or $(-Q-NH)_c-H$, Q is $C_1$-$C_{24}$—alkylene which can be interrupted by oxygen atoms, a is 0–5 and c is 0–5, at least one Z being other than OH,
n is 0 to 150 and
m is 1 to 5.

The compounds are obtained by alkoxylating resins or esterification products thereof with polyhydric alcohols and, after conversion of hydroxyl groups into suitable leaving groups, reacting the products of with amines of the formula Z-H.

The products are suitable above all as coupling auxiliaries, dispersants and formulating agents for colorants.

8 Claims, No Drawings

NITROGEN-CONTAINING CONDENSATION PRODUCTS BASED ON UNMODIFIED OR MODIFIED NATURAL RESINS, PROCESS FOR THE PREPARATION THEREOF AND THE USE THEREOF

The invention relates to the field of surface-active agents. The subject of the invention are compounds of the general formula (I)

$$A—[(X—O)_n—Y—Z]_m \qquad (I)$$

in which A is a radical of an unmodified or modified natural resin or of an esterification product thereof with a polyhydric alcohol, X is a group of the formula —CH$_2$CH$_2$—, —CH$_2$CH(CH$_3$)— or —CH(CH$_3$)—CH$_2$—, Y is a group of the formula —CH$_2$CH$_2$—, —CH$_2$CH(CH$_3$)—, —CH(CH$_3$)—CH$_2$— or —CH$_2$CH(OH)—CH$_2$—, Z is a radical of the formula —OH or of the formula (Ia)

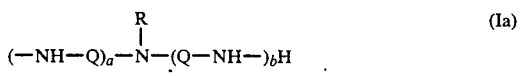
$$(—NH—Q)_a—\overset{R}{\underset{|}{N}}—(Q—NH—)_bH \qquad (Ia)$$

in which R is a hydrogen atom, an alkyl radical having 1-24 carbon atoms, preferably 1-18 carbon atoms, a radical of the formula (—CH$_2$CH$_2$O)$_p$—H, with p being an integer from 1 to 100, preferably 1 to 20, especially 1, or a radical of the formula (—Q—NH)$_c$—H, Q is a straight-chain or branched alkylene group which has 1 to 24, preferably 2 to 20, especially 2 to 4, carbon atoms and which can also be interrupted by one or more not directly adjacent oxygen atoms, a is an integer from 0 to 5, preferably 0 to 3, especially 1 or 2, b is an integer from 0 to 5, preferably 0 to 3, especially 0, and c is an integer from 0 to 5, preferably 0 or 1, especially 0, at least one radical Z being other than —OH, n is an integer from 0 to 150, preferably 5 to 30, and m is an integer from 1 to 5, preferably 2 or 3, and, in the case that there are several groups or radicals X, Y, Z, R or Q in the formula (I) and formula (Ia), the particular groups or radicals can have identical or different meanings.

Those compounds of the general formula (I) are of particular interest in which A is a radical of a natural resin acid, of a hydrogenated or disproportionated resin acid, of a resin amine or resin alcohol or of a resin acid modified by aryl or alkylaryl groups or of an esterification product obtained by esterification of one of the above resin acids with a dihydric to hexahydric alcohol while retaining free hydroxyl groups.

Those compounds of the general formula (I) are of particular interest in which X is the group of the formula —CH$_2$CH$_2$— and Y is the group of the formula —CH$_2$CH$_2$— or —CH$_2$CH(OH)—CH$_2$—.

Those compounds of the general formula (I) are of particular interest in which, in the formula (Ia), R is a hydrogen atom, Q is a straight-chain alkylene group having 2 to 20 carbon atoms, in particular 1,2-ethylene or 1,3-propylene, a is an integer from 1 to 5 and b is the number 0.

Those compounds of the general formula (I) are also of interest in which, in the formula (Ia), R is a straight-chain alkyl group having 1 to 18 carbon atoms or a group of the formula —CH$_2$CH$_2$OH, Q is a 1,2-ethylene or 1,3-propylene group, a is an integer from 0 to 5, preferably 0, 1 or 2, and b is the number 0.

Moreover, those compounds of the general formula (I) are of interest in which, in the formula (Ia), R is a hydrogen atom, Q is a 2-methyl-1,3-propylene group, a is an integer from 1 to 5 and b is the number 0.

The compounds according to the invention are obtained, for example, by alkoxylating natural resin acids, disproportionated or hydrogenated resin acids, resin alcohols, resin amines or resin acids modified by reaction with aromatic hydroxy compounds (phenols) or with halogen-eliminating cycloalkyl compounds and especially aralkyl and aryl compounds, and/or esterification products of the said resin acids with polyhydric alcohols, with ethylene oxide or propylene oxide or both epoxides successively or a mixture of the two epoxides, then causing the terminal hydroxyl groups of the resulting alkoxylates to react, in order to convert them into more reactive compounds, for example with epichlorohydrin or with thionyl chloride and then reacting the resulting halogen compounds with amines of the formula Z-H, Z being as defined for formula (Ia).

The following resin compounds are, for example, suitable for the preparation of the compounds according to the invention:

(a) natural resin acids and/or hydrogenation or disproportionation products thereof, the said resin compounds preferably being in the form of the commercially available colophony types or being obtained from these, (b) resin amines, such as are obtained from the resin acids mentioned under (a) by conversion to the resin acid nitrile and subsequent hydrogenation, (c) resin alcohols, such as are formed from the resin acids mentioned under (a) by reduction, in particular hydrogenation, (d) modified resin acids such as are obtained by addition or condensation with aromatic hydroxy compounds or with halogen-eliminating aromatic intermediates from the resin acids mentioned under (a), and (e) esterification products such as are obtained by esterifying a resin acid or a modified resin acid, such as are mentioned under (a) and (d), with a dihydric to hexahydric alcohol, free hydroxyl groups still having to be present in the esterification product.

Suitable starting products are, preferably, natural resin acids such as abietic acid, dehydroabietic acid, dihydroabietic acid, tetrahydroabietic acid, levopimaric acid, dextropimaric acid and isodextropimaric acid, such as are present in commercially available colophony types. Furthermore, disproportionated, hydrogenated and dimerized resin acids, resin alcohols such as abietyl alcohol and hydroabietyl alcohol, the commercially available mixture of dehydroabietyl alcohol, dihydroabietyl alcohol and tetrahydroabietyl alcohol (technical hydroabietyl alcohol) also being suitable, and resin amines derived from the abovementioned resin acids, in particular dehydroabietylamine, are preferably suitable.

Further suitable starting materials are resin/phenol compounds such as are obtained by addition of phenols such as hydroxybenzene, o-, m- and p-cresol, orthocresol acetate, salicylic acid, guajacol, bisphenol A, α-naphthol and β-naphthol to a natural resin acids or commercially available colophony types in the presence of strongly acidic or acid-eliminating catalysts such as, for example, boron trifluoride, hydrogen chloride, tin tetrachloride, aluminum trichloride or mineral acids, at a temperature of preferably 20° to 120° C. in an organic medium or in the presence of a strongly acidic ion exchanger at preferably 120° to 200° C., especially at 150° to 170° C., 0.5 to 0.8 and preferably 0.65 to 0.75 mole of the said phenols being employed per mole of resin acid.

Modified natural resin acids such as are obtained by reacting natural resin acids with a halogen-eliminating araliphatic or aromatic compounds, for example benzyl chloride, o-, m- and p-bis-(chloromethyl)-benzene, 2-, 3- and 4-chloromethyl-toluene, benzal chloride, 1- and 2-chloromethyl-naphthalene, 2-, 3- and 4-chlorophenol, 5-chloro-2-hydroxytoluene, 2-chloro-5-hydroxy-1,3-xylene, 4-chlorodiphenyl, 1- and 2-chloronaphthalene, 1-chloro-2-naphthol and 2-chloro-1-naphthol, or with cycloaliphatic compounds such as cyclohexyl chloride, in the presence of a catalyst such as, for example, zinc chloride, in a quantity of preferably 0.05 to 1, especially 0.1 to 0.5% by weight, at a temperature between 100° and 220° C., preferably 150° to 210° C., 0.5 to 1.0 and preferably 0.7 to 0.8 mole of the said chlorohydrocarbons being reacted per 1 mole of resin acid. Examples of suitable representatives of polyhydric alcohols for the esterification of the resin acids in the preparation of the resin compounds mentioned under (e) are: 1,2-ethanediol, 1,2-propanediol, 1,2- and 1,4-butanediol, 1,2,4-butanetriol, 1,1,1-trimethylolpropane, glycerol, pentaerythritol, dipentaerythritol, trimethylolethane, neopentyl glycol, 2,4-dihydroxy-3-methylolpentane, 1,2,6-hexanetriol, sorbitol, anhydrosorbitol, hexitol and mannitol, preferably glycerol. The esterification of the resin acids with the polyhydric alcohols is carried out at such a molar ratio that the esterification product still contains free hydroxyl groups. Preferably, a resin acid/polyhydric alcohol molar ratio of 1:1 is used. The esterification reaction can be carried out by conventional process at about 100° to 300° C., preferably at 160° to 270° C., if appropriate with addition of an entrainer, for example an aromatic hydrocarbon or chlorohydrocarbon, if appropriate with the addition of a catalyst such as benzenesulfonic acid, p-toluenesulfonic acid, boric acid, sulfuric acid, hydrochloric acid and tin powder. The alkoxylation of the natural and modified resin acids, resin alcohols, resin amines and resin acid esters, from which the resin radical A in the general formula (I) is derived, can be carried out by conventional methods. Preferably, the particular resin compound is reacted at a temperature from 100° to 200° C., preferably at 120° to 160° C., with ethylene oxide or propylene oxide or both epoxides (alternately or as a mixture) in the presence of a hydroxide or alkoxide as a catalyst, preferably an alkali metal hydroxide such as potassium hydroxide or especially sodium hydroxide, or an alkali metal alkoxide such as sodium methylate or sodium ethylate. The quantity of ethylene oxide and/or propylene oxide is such that 1 to 150, preferably 2 to 20 moles of ethylene oxide and/or propylene oxide are added per reactive hydrogen atom of the free carboxyl groups, hydroxyl groups or amino groups in the particular resin compound. The concentration of the alkali metal hydroxide or alkali metal alkoxide catalyst should preferably be 0.05 to 1.0% by weight, relative to the resin compound, at the start of the alkoxylation. The alkoxylation can be carried out unpressurized or in pressure vessels with propylene oxide or preferably ethylene oxide or mixtures of both epoxides, and the alkylene oxide can be fed in the gaseous or liquid form. The working pressure is as a rule 1 to 10, preferably 2 to 8 bar. The quantity of the added alkylene oxide can be varied and optimized depending on the intended use and the desired level of hydrophilic properties of the amine condensates of the formula (I) prepared from the ethoxylation products.

The resulting alkoxylation products can as a rule not be reacted directly with the amines of the formula Z-H. Therefore, reactive groups, preferably chlorine atoms or chloroalkyl groups, are introduced into the alkoxylation products at some or all the terminal hydroxyl groups. This is effected, for example, by adding epichlorohydrin to the terminal hydroxyl groups by processes known per se at a temperature from 20° to 100° C., preferably from 40° to 90° C., in the presence of a catalyst such as tin tetrachloride, preferably 0.1 to 2% of tin tetrachloride, relative to the weight of the ethoxylate. A direct exchange of the terminal hydroxyl groups for chlorine atoms is also possible, for example by reaction of alkoxylation products with halogenating agents such as thionyl chloride at a temperature from 40° to 100° C., preferably from 40° to 80° C. The alkoxylation products, which have been made reactive, can then be reacted with the amines of the formula Z-H, advantageously at a temperature from 20° to 130° C., preferably at 40° to 90° C. and especially at 70° to 90° C.

Examples of amines of the formula Z-H, Z being as defined in the said formula (Ia), are, for example, alkylenediamines and polyamines of the formula H(—NH—Q)$_a$—NH$_2$, a and Q being as defined for the formula (Ia). Examples of such compounds are 1,2-diaminoethane, 1,3-diaminopropane, 1,2-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, diethylenetriamine, dipropylenetriamine, triethylenetetramine, dipropylenetetramine, tetraethylenepentamine, tetrapropylenepentamine, pentaethylenehexamine, pentapropylenehexamine, hexaethyleneheptamine, hexapropyleneheptamine, heptaethyleneoctamine, heptapropyleneoctamine, 1,3-diamino-2,2-dimethylpropane, 1,2-diamino-2-methylpropane, 1,3-diamino-2-methylpropane, 2,5-diamino-2,5-dimethylhexane, N-(2-aminoethyl)-1,3-propylenediamine, N,N'-bis-(3-aminopropyl)ethylenediamine, 1,12-diamino-4,9-dioxadodecane, 1,13-diamino-4,7,10-trioxatridecane, bis-(3-aminopropyl)-polytetrahydrofurans and 1,10-diamino-4,7-dioxadecane, preferably 1,2-diaminoethane and 1,3-diaminopropane. Ammonia, the simplest nitrogen-containing compound of the above formula, is also suitable.

Amines of the formula H(—NH—Q)$_a$—NHCH$_2$CH$_2$OH are also suitable, for example alkylolamines such as N-(2-hydroxyethyl)-1,2-diaminoethane, N-(2-hydroxyethyl)-diethylenetriamine, N-(2-hydroxyethyl)-triethylenetetramine and 2-aminoethanol.

Further suitable amines have the formula H(—NH—Q)$_a$NR—(Q—NH)$_b$—H, in which a, b, Q and R are as defined for the formula (Ia) and R is other than hydrogen. Examples of such amines are fatty amines such as methylamine, ethylamine, propylamine, butylamine, pentylamine, hexylamine, heptylamine, octylamine, decylamine, undecylamine, dodecylamine, tridecylamine, tetradecylamine, pentadecylamine, hexadecylamine, heptadecylamine, octadecylamine, nonadecylamine, eicosylamine, heneicosylamine, docosylamine, tricosylamine, tetracosylamine and mixtures of the fatty amines, especially the technical fatty amines, such as coconut fatty amine, oleylamine, stearylamine and tallow fatty amine. Polyamines of the formula given above are also suitable, for example N-methyl-ethylenediamine, N-methylpropylenediamine, N-ethyl-ethylenediamine, tallow fatty propylenediamine, coconut fatty propylenediamine, N-stearyl-1,3-diaminopropane, N-stearyl-N-(3-aminopropyl)-1,3-diaminopropane, N-(3-stearylamino-propyl)-1,3-diaminopropane, N-tallow fatty-N-(3-aminopropyl)-1,3-diaminopropane, N-(3-tallow fatty amine-propyl)-1,3-diaminopropane, N-oleyl-N-(3-aminopropyl)-1,3-diaminopropane and bis-(3-aminopropyl)-methylamine. Amines with 3 aminoalkylene groups or polyaminoalkylene groups on one nitrogen atom, for example N,N-bis-(3-aminopropyl)-propylenediamine, are also suitable.

The abovementioned amines or mixtures of these amines are reacted with the alkoxylated resin compounds, which carry reactive chlorine atoms, with elimination of hydrochloric acid, a pH of 7.0 to 8.0 (measured after dilution with water in a 1% solution or emulsion) being preferably reached after the reaction.

The compounds according to the invention and their mixtures are emulsifiable to soluble, giving a clear solution, in water and, according to the Ross-Miles Test (DIN 53902) show only a low tendency to foam with a simultaneous reduction in surface tension according to the anchor-ring method (DIN 53914) down to about $39 \times 10^{-3}$ N/m. The compounds according to the invention have good wetting power; thus, according to the dip-wetting method (DIN 53901), a cotton fabric is wetted at 70° C. as a rule within a time of less than 1 minute.

The invention also relates to the use of the compound according to the invention as a surface-active agent. Due to their many-sided surface-active properties, the substances according to the invention have a wide spectrum of applications. An advantageous use is as a coupling aid in the preparation of azo colorants, especially of azo pigments, and as auxiliaries for fine dispersion and stabilization of colorants and solids, and also as a wetting agent and leveling agent. The auxiliaries are very suitable as dispersing and formulating agents for the preparation of readily free-flowing pigment formulations. Furthermore, the condensation products according to the invention can be used as retention agents and flocculating agents.

The compounds according to the invention can be employed individually or as mixtures and also in combination with other non-ionic and/or cationic surfactants. Furthermore, they can be used together with builders or other conventional additives or auxiliaries.

In the Examples which follow, "parts" relate to the weight.

PREPARATION EXAMPLE 1

(a) Preparation of the resin acid ethoxylate:

302 parts of colophony are, after addition of 2.2 parts of sodium methylate, alkoxylated in a pressure vessel with stirring and introduction of 440 parts of ethylene oxide at 150° to 160° C., while maintaining a pressure of 4 to 6 bar. When all the ethylene oxide has been injected, stirring is continued for one hour at 150° to 160° C. The resulting resin acid adduct contains on average 10 ethyleneoxy units per molecule.

(b) Preparation of resin amine condensate:

500 parts of resin acid ethoxylate (a) are heated to 50° C., and 2.5 parts of tin tetrachloride are added and, in the course of 30 to 45 minutes, 62 parts of epichlorohydrin are added dropwise, the internal temperature rising to 70° to 80° C. The mixture is then stirred, with nitrogen blanketing, for 4 hours at 80° to 85° C. 50 parts of 1,3-propanediamine are then introduced at the same temperature in the course of about 30 minutes, and stirring is continued for a further 6 hours at 80° C. to 90° C. and a pH of 7.0 to 8.0, the hydrogen chloride gas formed being removed by means of nitrogen gas. The amine condensate obtained has a brown color, a waxy consistency and an amine number of 128. (The amine number according to DIN/ISO 3771 indicates the quantity of potassium hydroxide in milligrams, which corresponds to one gram of amine condensate in the neutralization with perchloric acid).

PREPARATION EXAMPLE 2

(a) Preparation of the resin alcohol alkoxylate:

288 parts of technical hydroabietyl alcohol (from Hercules, U.S.A.) are, after the addition of 1 part of potassium hydroxide, alkoxylated in a pressure vessel with stirring and introduction of 528 parts of ethylene oxide at 150° to 160° C. while maintaining a pressure of about 1.5 to 2 bar. When all the ethylene oxide has been injected, stirring is continued for one hour at 150° to 160° C. The resin alcohol adduct obtained contains on average 12 ethylenoxy units per molecule.

(b) Preparation of the resin amine condensate:

After the addition of 2.5 parts of tin tetrachloride, 500 parts of resin alcohol ethoxylate (a) are, corresponding to compound (1b), reacted with 56.6 parts of technical epichlorohydrin and reacted with 53.4 parts of diethylenetriamine at 80° to 85° C., while passing through nitrogen. This gives a pale yellow, wax-soft product having an amine number of about 110.

PREPARATION EXAMPLE 3

(a) Preparation of the resin acid glycerol ester:

302 parts of colophony are esterified in the presence of 4 parts of tin powder with 92 parts of glycerol in a suitable stirred vessel, while distilling off the water of reaction in the course of 8 to 10 hours at 230° to 250° C., nitrogen being passed through simultaneously, down to an acid number (DIN 53183) of 20 (the acid number indicates the quantity of potassium hydroxide in milligrams, which is consumed for neutralizing 1 g of the reaction product).

(b) Preparation of the resin acid glycerol ester alkoxylate:

After the addition of 2.7 parts of sodium methylate, 356 parts of resin acid glycerol ester according to (a) are alkoxylated in a pressure vessel with stirring and introduction of 440 parts of ethylene oxide at 150 to 160° C., while maintaining a pressure of 2 to 8 bar. After all the ethylene oxide has been injected, stirring is continued for 1 hour at 150° to 160° C. The resin acid glycerol ester adduct obtained contains on average 10 ethylenoxy units per molecule.

(c) Preparation of the resin amine condensate:

500 parts of the resin acid glycerol ester adduct from (b) are, after the addition of 3 parts of tin tetrachloride, heated to 50° C., and 112.7 parts of epichlorohydrin are added dropwise in the course of 60 minutes. The internal temperature is raised from 80° to 90° C. during the dropwise addition. After stirring for 4 hours while passing through nitrogen gas, 73.5 parts of 1,2-diaminoethane are added dropwise in the course of about 45 minutes at the same temperature. Stirring is then continued for a further 5 hours, while passing through nitrogen gas, until a pH of 7 to 8 is reached. This gives a brown-colored product of waxy consistency. The amine number of the product is between 215 and 220.

PREPARATION EXAMPLE 4

(a) Preparation of the ethoxylated resin acid glycerol ester:

339 parts of disproportionated colophony are esterified with 92 parts of glycerol corresponding to Preparation Example (3a) and alkoxylated with 792 parts of ethylene oxide corresponding to Preparation Example (3b). The resin acid glycerol ester adduct obtained contains 18 ethylenoxy units per molecule.

(b) Preparation of the resin amine condensate:

500 parts of resin acid glycerol ester adduct (a) are heated to 40° C., and 10 parts of activated carbon are added and, in the course of 40 minutes, 306 parts of thionyl chloride are added dropwise, the internal temperature being raised to 80° to 85° C. Stirring is then continued for 3 hours at the same temperature, while passing through nitrogen. The excess thionyl chloride is then distilled off, and stirring is continued for a further 3 hours, while passing through nitrogen gas. After the activated carbon has been removed, 52 parts of 1,2-diaminoethane are introduced at 80° to 90° C., and stirring is continued for a further 4 hours, while passing through nitrogen gas, until a pH of 7 to 8 is reached. The amine condensate obtained is brown-colored and has a waxy consistency. It has amine number between 160 and 165.

PREPARATION EXAMPLE 5

(a) Preparation of the resin acid pentaerythritol ester:

302 parts of colophony are esterified in the presence of 4.5 parts of boric acid with 136 parts of pentaerythritol corresponding to Preparation Example 3(a), until an acid number of 15 is reached.

(b) Preparation of the resin acid ester ethoxylate:

After the addition of 3.1 parts of sodium methylate, 420 parts of resin acid pentaerythritol ester (a) are reacted with 660 parts of ethylene oxide corresponding to Preparation Example 3(b). The resin acid ester adduct obtained contains on average 15 ethylenoxy units per molecule.

(c) Preparation of the resin amine condensate:

After the addition of 4 parts of tin tetrachloride, 128 parts of epichlorohydrin are added at 50° C. internal temperature to 500 parts of resin acid pentaerythritol ester adduct, (b) analogously to Preparation Example 3(c), and the mixture is stirred for 6 hours at 80° C. to 85° C. with nitrogen gas blanketing. 85 parts of 1,2-diaminoethane are then added and the mixture is stirred for a further 4 hours at the same temperature, while passing through nitrogen gas, until a pH of 7.5 to 8 is reached. This gives a pale yellow waxy amine compound having an amine number of 245 to 248.

PREPARATION EXAMPLE 6

(a) Preparation of the resin acid phenol compound:

302 parts of colophony and 66 parts of phenol are, after the addition of 25 parts of a strongly acidic ion exchanger, heated at 160° to 165° C. under reflux and stirred, with nitrogen gas blanketing. The product is then separated from the ion exchanger by running it out through the strainer in the bottom valve. The resin acid phenol compound still contains 3.95% of free phenol.

(b) Preparation of resin phenol ethoxylate:

360 parts of the modified resin described under (a) are, after the addition of 1.5 parts of sodium hydroxide, ethoxylated in a pressure vessel with stirring and introduction of 704 parts of ethylene oxide at 150° to 170° C., while maintaining a pressure between 1.5 and 2.5 bar. After all the ethylene oxide has been injected, stirring is continued for 1 hour at 150° to 160° C. The resin alkoxylate obtained contains on average 16 ethylenoxy units per molecule.

(c) Preparation of the resin amine condensate:

500 parts of resin phenol ethoxylate from (b) are reacted, corresponding to Preparation Example 1(b) in the presence of 5 parts of tin tetrachloride with 88.2 parts of epichlorohydrin and then with 71.0 parts of 1,3-diaminopropane at 75° to 85° C. The resulting pale brown amine condensate of wax-solid consistency has an amine number of about 188.

PREPARATION EXAMPLE 7

(a) Preparation of the resin cresol compound:

302 parts of colophony are reacted corresponding to Preparation Example 6(a) with 75 parts of technical m-cresol at 160° to 165° C. After the ion exchanger has been separated off, a product is obtained which has an acid number of 120 and still contains 3.7% of unreacted cresol.

(b) Preparation of the resin cresol glycerol ester:

370 parts of the resin cresol compound from (a) are in the presence of 6 parts of tin powder with 90 parts of glycerol corresponding to Preparation Example 3(a), while the water of reaction is distilled off in the course of 8 to 10 hours at 230° to 250° C. while simultaneously passing through nitrogen gas, down to an acid number of 10.

(c) Preparation of the ethoxylate:

450 parts of glycerol ester from (b) are ethoxylated, after the addition of 33 parts of sodium methylate, with 792 parts of ethylene oxide analogously to Preparation Example 6(b). The adduct obtained contains about 18 ethylenoxy units per molecule.

(d) Preparation of the resin amine condensate:

Analogously to Preparation Example 3(c), 500 parts of ethoxylate from (c) are, after the addition of 4.0 parts of tin tetrachloride, reacted with 75 parts of epichlorohydrin at 80° to 85° C. and condensed with 50 parts of 1,2-diaminoethane at the same internal temperature. The pale brown, pasty amine condensate has an amine number of 150 to 152.

PREPARATION EXAMPLE 8

(a) Preparation of the monoglycerol ester of a benzylated resin:

302 parts of colophony in 126.5 parts of benzyl chloride are, after the addition of 0.4 part of zinc chloride, slowly heated to 100° C., while passing through nitrogen, and held for 2 hours at this temperature. After this time, the evolution of hydrogen chloride subsides, and the temperature is raised to 200° C. and held for about 1 hour at 200° to 210° C., until the reaction product is virtually free of halogen. After cooling to about 100° C. and the addition of 92 parts of glycerol and 130 parts of xylene, the mixture is heated under reflux and the water of reaction is collected in a water separator, by means of azeotropic distillation. The reaction has ended after 4 hours, and the volatile constituents are removed by distillation under a reduced pressure or by means of a rotary evaporator. The residue obtained is a pale resin having an acid number of 30 and a softening point of 120° to 125° C.

(b) Preparation of the ethoxylate:

465 parts of the glycerol ester described under (a) are ethoxylated after the addition of 3.4 parts of sodium methylate and 660 parts of ethylene oxide. The viscous resin glycerol adduct obtained is brown and contains on average 13.6 ethylenoxy units per molecule.

(c) Preparation of the amine condensate:

Analogously to Preparation Example 1(a), 2.5 parts of tin tetrachloride are added to 500 g of ethoxylate from (b), and the mixture is reacted at 80° to 85° C. with 85 parts of epichlorohydrin. After stirring for 3 hours, 69 parts of 1,3-diaminopropane are added and reacted at the same temperature until a pH of 7.5° to 8.0 is reached. The yellow-brown, wax-solid product has an amine number of 162.

PREPARATION EXAMPLE 9

(a) Preparation of the resin amine ethoxylate:

287 parts of technical dehydroabietylamine (amine D from Hercules, U.S.A.) are, after the addition of 4.5 parts of sodium methylate (30% in methanol) and after removal of the excess methanol by evacuation, reacted in a pressure vessel with ethylene oxide at 120 to 140° C., while maintaining a pressure between 1.5 and 2.5 bar. After the full quantity of ethylene oxide has been injected, the mixture is stirred for 1 further hour at 130° to 140° C. This gives a viscous brown product which contains on average 10 ethylenoxy units per molecule.

(b) Preparation of the resin amine condensate:

500 parts of ethoxylate (a) are heated to 50° C. internal temperature and 3 parts of tin tetrachloride are added. While raising the temperature to 75° to 80° C., 127 parts of epichlorohydrin are added dropwise in the course of 45 to 60 minutes under a nitrogen atmosphere and stirring is then continued for a further 4 hours at 80 to 85° C. 83 parts of 1,2-diaminoethane are then added at the same temperature in the course of 30 to 45 minutes and stirring is continued for a further 4 hours up to a pH of 7.5 to 8.0. This gives a pale yellow, wax-soft resin amine condensate having an amine number of 152.

PREPARATION EXAMPLE 10

(a) Preparation of the resin amine ethoxylate:

287 parts of technical dehydroabietylamine (amine D from Hercules, U.S.A.) are ethoxylated analogously to Preparation Example 9(a) with 440 parts of ethylene oxide. 112 parts of propylene oxide are then introduced at 120° to 140° C. and under a pressure of 2 to 4 bar, and the mixture is stirred for one further hour at the same temperature. This gives a viscous resin amine ethoxylate which contains on average 10 ethylenoxy units and 2 propylenoxy units per molecule.

(b) Preparation of the amine condensate:

500 parts of alkoxylate (a) are reacted analogously to Preparation Example 4(a) with 306 parts of thionyl chloride. 71.5 parts of 1,2-diaminoethane are then added in the course of 2 hours at 80° to 90° C. After stirring for a further 4 hours at the same internal temperature, this gives a yellow-colored, wax-soft amine condensate having an amine number between 185 and 192.

PREPARATION EXAMPLE 11

(a) Preparation of the resin amine ethoxylate:

287 parts of technical dehydroabietylamine (amine D from Hercules, U.S.A.) are reacted, after the addition of 4.5 parts of sodium methylate, with 1320 parts of ethylene oxide correspondingly to Preparation Example 9(a). This gives a pale yellow, waxy resin amine adduct which contains on average 30 ethylenoxy units per molecule.

(b) Preparation of the amine condensate:

5 parts of tin tetrachloride are added to 500 parts of the ethoxylate (a). After heating to 50° C., 58 parts of epichlorohydrin are added dropwise in the course of 45 minutes under a nitrogen gas atmosphere, the internal temperature being raised to 70° to 80° C. After stirring for 6 hours, 97.5 parts of tallow fatty amine and 23.2 parts of 1,3-diaminopropane are added in the course of 1 to 2 hours, while the temperature is raised to 80° to 90° C. After a further 6 hours at the same temperature, a pH of 8 being reached, this gives a yellow waxy amine condensate having an amine number between 75 and 85.

PREPARATION EXAMPLE 12

(a) Preparation of the resin acid ethoxylate:

After the addition of 0.5 part of pulverulent caustic soda, 302 parts of colophony are reacted with 1320 parts of ethylene oxide correspondingly to Preparation Example 1(a). The product contains on average 30 ethylenoxy units per molecule.

(b) Preparation of the amine condensate:

500 parts of ethoxylate (a) are heated to 50° C. internal temperature and 2.5 parts of tin tetrachloride are added. 92.5 parts of epichlorohydrin are then added dropwise with stirring under a nitrogen atmosphere in the course of 45 to 60 minutes, while raising the temperature to 70° to 80° C. After stirring for a further 6 hours at 75° to 85° C., the excess epichlorohydrin is distilled off under reduced pressure. 122 parts of N,N-bis-(aminopropyl)-tallow fatty amine are then added with stirring at the same temperature. Stirring is then continued for a further 4 hours, a pH of 7.5 to 8 being reached. The resulting amine condensate has an amine number between 50 and 60.

PREPARATION EXAMPLE 13

(a) Preparation of the resin acid glycerol ester:

339 parts of disproportionated colophony are, correspondingly to Preparation Example 3(a), esterified in the presence of 6 parts of tin powder with 92 parts of glycerol, down to an acid number of 2.5.

(b) Preparation of the resin acid glycerol ester alkoxylate:

380 parts of resin acid glycerol ester according to (a) are, after the addition of 3.5 parts of sodium methylate, alkoxylated in a pressure vessel with stirring and introduction of 485.8 parts of ethylene oxide at 150° to 160° C., while maintaining a pressure of 2 to 8 bar. After all the ethylene oxide has been injected, stirring is continued for 1 hour at 150° to 160° C. The resin acid glycerol ester adduct obtained contains on average 12 ethylenoxy units per molecule.

(c) Preparation of the resin amine condensate:

380 parts of resin acid glycerol ester adduct (a) are heated to 40° C., 15 parts of activated carbon are added and, in the course of 40 minutes, 325 parts of thionyl chloride are added dropwise, the internal temperature being raised to 80° to 85° C. The mixture is then stirred for a further 3 hours at the same temperature, while passing through nitrogen. The excess thionyl chloride is then distilled off and stirring is continued for a further 3 hours while passing through nitrogen. After the activated carbon has been removed, 110.5 parts of 1,2-diaminoethane are introduced at 80° to 90° C. and stirring is continued for a further 4 hours, while passing through nitrogen gas, until a pH of 7 to 8 is reached.

The amine condensate obtained is brown-colored and has a waxy consistency. It has an amine number between 190 and 197.

PREPARATION EXAMPLE 14

(a) Preparation of the resin acid phenol compound:
After the addition of 25 parts of a strongly acidic ion exchanger, 302 parts of colophony and 66 parts of phenol are heated for 36 hours at 160° to 165° C. under reflux 30 with nitrogen gas blanketing and worked up correspondingly to Preparation Example 6(a). The resin acid phenol compound still contains 3.15% of free phenol.

(b) Preparation of the resin phenol ethoxylate:
360 parts of the modified resin described under (a) are, after the addition of 1.5 parts of sodium hydroxide, ethoxylated in a pressure vessel with stirring and with introduction of 792 parts of ethylene oxide at 150° to 170° C., while maintaining a pressure between 1.5 and 2.5 bar. After all the ethylene oxide has been injected, the mixture is stirred for 1 further hour at 150 to 160° C. The resin alkoxylate obtained contains on average 18 ethylenoxy units per molecule.

(c) Preparation of the resin amine condensate:
153 parts of thionyl chloride are added in the course of 60 minutes in the presence of 20 parts of activated carbon to 500 parts of resin phenol ethoxylate from (b) corresponding to Preparation Example 13(b), and the mixture is stirred for 4 hours at 85° to 90° C. while passing through nitrogen. After corresponding working up, 153 parts of 1,2-diaminoethane are introduced at the same internal temperature, and stirring is continued for a further 4 hours, a pH of 7.5 to 8.5 being reached. The amine condensate obtained is brown-colored and has a waxy consistency. It has an amine number between 170 and 176.

PREPARATION EXAMPLE 15

(a) Preparation of the resin acid ethoxylate:
302 parts of colophony are, after the addition of 0.5 part of pulverulent caustic soda, reacted with 1320 parts of ethylene oxide, corresponding to Preparation Example 1(a). The product contains on average 30 ethylenoxy units per molecule.

(b) Preparation of the amine condensate:
500 parts of alkoxylate (a) are reacted with 236 parts of thionyl chloride analogously to Preparation Example 4(b). 113 parts of N,N-bis-(3-aminopropyl)-tallow fatty amine are then added with stirring at 80° to 90° C. Stirring is then continued for a further 4 hours, a pH of 7.5 to 8 being reached. The resulting amine condensate has an amine number between 60 and 66.

PREPARATION EXAMPLE 16

(a) Preparation of the resin amine ethoxylate:
287 parts of a resin amine (amine D from Hercules, U.S.A.) are ethoxylated with 1360 parts of ethylene oxide analogously to Preparation Example 9(a). 282 parts of propylene oxide are then introduced at 120° to 140° C. and under a pressure of 2 to 4 bar, and stirring is continued for one hour at the same temperature. This gives a pale yellow, waxy solid resin amine ethoxylate which contains on average 30 ethylenoxy units and 4 propylenoxy units per molecule.

(b) Preparation of the amine condensate:
500 parts of alkoxylate (a) are reacted with 306 parts of thionyl chloride analogously to Preparation Example 4(b). 71.0 parts of tallow fatty amine and 19.7 parts of 1,3-diaminopropane are then added in the course of 2 hours at 80° to 90° C. After stirring for 4 hours at the same temperature, a pH sample gives 7.5 to 8. The resulting product is a yellow-colored, wax-solid amine condensate having an amine number between 90 and 100.

APPLICATION EXAMPLE 1

60.2 parts of 1-acetoacetylamino-2,4-dimethylbenzene and 6.1 parts of 1-acetoacetylamino-2,5-dimethoxy-4-chlorobenzene are dissolved in 900 parts of water and 31 parts by volume of 33% sodium hydroxide solution and, after the addition of 1.5 parts of a fatty alcohol polyglycol ether, precipitated by means of 22 parts by volume of acetic acid. After the addition of 7.5 parts of the product from Preparation Example 9(b), coupling is carried out with a solution of tetrazotized 4,4'-diamino-3,3'-dichlorodiphenyl, the tetrazonium salt solution having been prepared by the addition of 60 parts by volume of aqueous 5 N sodium nitrite solution to a mixture of 38 parts of 4,4'-diamino-3,3'-dichlorodiphenyl, 183 parts by volume of 5 N hydrochloric acid and 520 parts of water. After the coupling has ended, the pigment suspension is treated with 2.5 parts of a resin amine, rendered alkaline, then treated with a solution, which contains 1.8 parts of coconut fatty dimethylamine oxide and 36 parts of a partially hydrogenated colophony, and heated for 30 minutes at 98° C. The mixture is then adjusted with hydrochloric acid to pH 4 and heated for a further 30 minutes at 98° C. It is then filtered, washed and dried. This gives a pigment formulation which, when incorporated into printing ink varnish for letter press and offset printing, gives a printing ink which has very good application properties. As compared with a printing ink prepared without the addition of the product from Preparation Example 9(b), the printing ink is distinguished by an improved flow behavior.

APPLICATION EXAMPLE 2

If the product from Preparation Example 9(b), used in Application Example 1, is replaced by the product from Preparation Example 3(c), a pigment formulation having similarly good properties as described in Application Example 1 is obtained.

APPLICATION EXAMPLE 3

32.3 parts of 1-acetoacetylamino-2,4-dimethylbenzene and 30.1 parts by weight of 1-acetoacetylamino-2-methylbenzene are dissolved in 750 parts of water and 31 parts by volume of 33% sodium hydroxide solution and, after the addition of 1.5 parts of a fatty alcohol polyglycol ether, precipitated by means of 22 parts by volume of acetic acid. After the addition of 7.5 parts of the product from Preparation Example 9(b), coupling is carried out with a solution, prepared analogously to Application Example 1, of 38 parts of tetrazotized 4,4'-diamino-3,3'-dichlorodiphenyl. The pigment suspension is then rendered alkaline, a solution of 28 parts of a gum rosin is added, and the mixture is heated for 1 hour at 98° C. It is then adjusted with hydrochloric acid to pH 4 and heated for a further hour at 98° C. Subsequently, it is filtered, washed and dried. A printing ink prepared analogously to Application Examples 1 and 2 shows comparably good printing properties, especially an improved flow behavior as compared with a printing ink which has been prepared without the addition of the compound from Preparation Example 9(b).

APPLICATION EXAMPLE 4

If the product from Preparation Example 9(b), used in Application Example 3, is replaced by the product from Preparation Example 2(b), a pigment formulation having similarly good properties as described in Application Example 3 is obtained.

APPLICATION EXAMPLE 5

If the product from Preparation Example 9(b), used in Application Example 3, is replaced by the product from Preparation Example 10(b), a pigment formulation having similarly good properties as described in Application Example 3 is obtained.

We claim:

1. A composition of matter having compound of the formula (I)

$$A-[(X-O)_n-Y-Z]_m \qquad (I)$$

in which
- A is a radical of an unmodified or modified natural resin or of an esterification product thereof with a polyhydric alcohol,
- X is a group of the formula
  $-CH_2CH_2-$, $-CH_2-CH(CH_3)-$ or $-CH(CH_3)-CH_2-$,
- Y is a group of the formula
  $-CH_2CH_2-$, $-CH_2CH(CH_3)-$, $-CH(CH_3)-CH_2-$ or $-CH_2CH(OH)CH_2-$,
- Z is a radical of the formula -OH or of the formula (Ia)

$$(-NH-Q)_a-\overset{R}{\underset{|}{N}}-(Q-NH-)_bH \qquad (Ia)$$

in which
- R is a hydrogen atom, an alkyl radical having 1 to 24 carbon atoms, a radical of the formula $(-CH_2CH_2O)_p-H$, with p being an integer from 1 to 100, or a radical of the formula $(-Q-NH)_c-H$, Q is a straight-chain or branched alkylene group which has 1 to 24 carbon atoms and which can also be interrupted by one or more not directly adjacent oxygen atoms, a is an integer from 0 to 5, b is an integer from 0 to 5 and c is an integer from 0 to 5, at least one radical Z being other than -OH,
- n is an integer from 0 to 150 and
- m is an integer from 1 to 5, and, in the case that there are several groups or radicals X, Y, Z, R or Q in the formula (I) and formula (Ia), the particular groups or radicals can have identical or different meanings.

2. A composition of matter as claimed in claim 1, wherein, in the radical Z of the formula (Ia),
- R is a hydrogen atom or an alkyl radical having 1 to 18 carbon atoms or a radical of the formula $(-CH_2CH_2O)_p-H$, with p being a number from 1 to 20, and
- Q is a straight-chain or branched alkylene group having 2 to 20 carbon atoms.

3. A composition of matter as claimed in claim 1, wherein, in the radical Z of the formula (Ia),
- R is a hydrogen atom or the group of the formula $-CH_2CH_2-OH$ and
- Q is an alkylene group of the formula $-CH_2CH_2-$, $-CH_2CH_2CH_2-$ or $-CH_2CH(CH_3)-CH_2-$.

4. A composition of matter as claimed in claim 1, wherein A is a radical of a natural resin acid, of a hydrogenated or disproportionated resin acid, of a resin amine, of a resin alcohol, of a resin acid modified by aryl or arylalkyl groups or of an esterification product obtained by esterification of one of the abovementioned resin acids with a dihydric to hexahydric alcohol while retaining free hydroxyl groups.

5. A composition of matter as claimed in claim 1, wherein, in the formula (I),
- n is an integer from 5 to 30 and
- m is the integer 1 or 2.

6. A process for preparing a composition of matter as defined in claim 1, which comprises alkoxylating a natural or modified resin and/or an esterification product thereof with a polyhydric alcohol, the esterification product still having at least one free hydroxyl group, with ethylene oxide or propylene oxide or both epoxides successively or a mixture of the two epoxides, then reacting the terminal hydroxyl groups of the alkoxylate with epichlorohydrin or thionyl chloride and reacting the resulting particular halogen compound with one or more amines of the formula Z-H, in which Z is a radical of the formula (Ia) defined in claim 1.

7. The process as claimed in claim 6, wherein at least one of the following compounds is used as the unmodified and modified natural resin and esterification product thereof with a polyhydric alcohol:
natural, disproportionated or hydrogenated resin acids, resin alcohols, resin amines, resin acids modified with halogen-eliminating cycloalkyl, aralkyl or aryl compounds, and esterification products of the abovementioned resin acids obtained by esterification with a dihydric to hexahydric alcohol, free hydroxyl groups still being present in the esterification product.

8. The process as claimed in claim 6, wherein, in the amine of the formula Z-H defined above,
R is a hydrogen atom, Q is a straight-chain alkyl group having 2 to 20 carbon atoms, a is an integer from 1 to 5 and b is the number 0.

* * * * *